US011525709B2

United States Patent
Pusheck

(10) Patent No.: US 11,525,709 B2
(45) Date of Patent: Dec. 13, 2022

(54) ELECTRONIC UNIT WITH VENT INTEGRATED WITH TERMINAL APERTURE

(71) Applicant: Veoneer US, Inc., Southfield, MI (US)

(72) Inventor: Jacob Pusheck, West Bloomfield, MI (US)

(73) Assignee: VEONEER US, LLC, Southfield, MI (US)

(*) Notice: Subject to any disclaimer, the term of this patent is extended or adjusted under 35 U.S.C. 154(b) by 540 days.

(21) Appl. No.: 16/382,147

(22) Filed: Apr. 11, 2019

(65) Prior Publication Data

US 2020/0326212 A1    Oct. 15, 2020

(51) Int. Cl.
  *G01D 11/24* (2006.01)
  *B60R 11/00* (2006.01)
  *B60R 16/023* (2006.01)

(52) U.S. Cl.
  CPC ........... *G01D 11/245* (2013.01); *B60R 11/00* (2013.01); *B60R 16/0232* (2013.01); *B60R 16/0239* (2013.01); *B60R 2011/0094* (2013.01)

(58) Field of Classification Search
  CPC ...... G01D 11/245; G01D 11/30; G01D 11/24; B60R 16/0231; B60R 11/00; B60R 11/0264; B60R 16/0232; B60R 16/0239; B60R 2011/0094; H01R 13/6683; H01R 12/57; H01R 13/41; H01R 43/0256; H01R 43/205; H05K 5/0078
  See application file for complete search history.

(56) References Cited

U.S. PATENT DOCUMENTS

| | | |
|---|---|---|
| 5,589,669 A | 12/1996 | Downes et al. |
| 2005/0183509 A1* | 8/2005 | Eisenhower ........... G01L 27/007 73/753 |
| 2008/0084005 A1 | 4/2008 | Steele et al. |
| 2010/0332074 A1 | 12/2010 | Brisighella et al. |
| 2011/0107835 A1 | 5/2011 | Campbell et al. |
| 2011/0290030 A1* | 12/2011 | Willner ............... G01L 19/0627 73/720 |
| 2014/0027656 A1 | 1/2014 | Yamada et al. |
| 2015/0208525 A1 | 7/2015 | Negishi et al. |
| 2017/0132954 A1 | 5/2017 | Birk |
| 2018/0023981 A1* | 1/2018 | Forwerck ............. G01D 11/245 73/866.5 |
| 2018/0055172 A1 | 3/2018 | Shuto |

* cited by examiner

*Primary Examiner* — John Fitzgerald
*Assistant Examiner* — Truong D Phan
(74) *Attorney, Agent, or Firm* — Dickinson Wright PLLC

(57) ABSTRACT

A circuit assembly for mounting on a vehicle assembly is provided. The circuit assembly may be a mountable sensor assembly. The assembly may include a housing with a cavity that houses a circuit, for example a sensor circuit. The circuit may be sealed in the cavity of the housing by epoxy. The housing may include a connector recess with terminals extending into the connector recess. The terminals may provide an electrical connection to the circuit. The housing may have openings between the cavity and the connector recess through which the terminals extend. One or more of the openings may have a cross sectional profile larger than the cross sectional profile of the terminal such that a passage is formed between the cavity and the recess after the terminal is inserted through the opening.

20 Claims, 10 Drawing Sheets

ELECTRONIC UNIT WITH VENT INTEGRATED WITH TERMINAL APERTURE

BACKGROUND

1. Field of the Invention

The present invention generally relates to a circuit assembly with a housing.

2. Description of Related Art

The housing of a circuit assembly may be provided to protect the circuit from contamination and the circuit may be sealed within the housing. This may be particularly important for circuit assemblies such as remote sensing units attached to automotive assemblies to monitor conditions within a vehicle. Sealing the circuit assembly within the housing improves reliability of the circuit over the life of the product.

SUMMARY

A circuit assembly for mounting on a vehicle assembly is provided. The circuit assembly may be a mountable sensor assembly. The assembly may include a housing with a cavity that houses a circuit, for example a sensor circuit. The circuit may be sealed in the cavity of the housing by a sealant, such as epoxy or other sealants. The housing may include a connector recess with terminal(s) extending into the connector recess. The terminal(s) may provide an electrical connection to the circuit. The housing may have openings between the cavity and the connector recess through which the terminals extend. One or more of the openings may a cross sectional profile larger than a cross sectional profile of the terminal such that a passage is formed between the cavity and the recess after the terminal is inserted through the opening. This passage may allow trapped gasses or liquids to escape the cavity where the circuit is located or allow for pressure to be applied for testing.

Further objects, features, and advantages of this invention will become readily apparent to persons skilled in the art after a review of the following description, with reference to the drawings and claims that are appended to and form a part of this specification.

DETAILED DESCRIPTION

During the manufacture of circuit assemblies, especially sheet metal mountable sensor assemblies for use on automotive assemblies within a vehicle, pressure from gasses may be trapped in the assembly during manufacturing. After the circuit is inserted into the housing the circuit cavity may be sealed with a sealant (e.g. epoxy) to protect the circuit from contaminates. However, gas trapped in or under the sealant may generate pressure against the circuitry. For circuit assemblies where terminals are stitched into the housing, (e.g. rather than insert molded) the terminal holes may be made with a cross sectional area that is larger than the terminals to form one or more passages between the cavity where the circuit is located and the connector recess. These passages allow the gas to be evacuated and pressure to be relieved from the cavity where the circuit is located. Further, by using the passages formed by using a terminal opening with a larger cross sectional area the space used, the reliability, and manufacturing ease are all improved. Making a separate hole to relieve gas would require a separate pin in the mold which would be easily broken and not easily verified. Additionally, the space required to put in an independent hole would be greatly increased to maintain structural integrity of the housing walls. Further, the vent holes may be used for applying pressure to the cavity for testing purposes.

Figure 1:
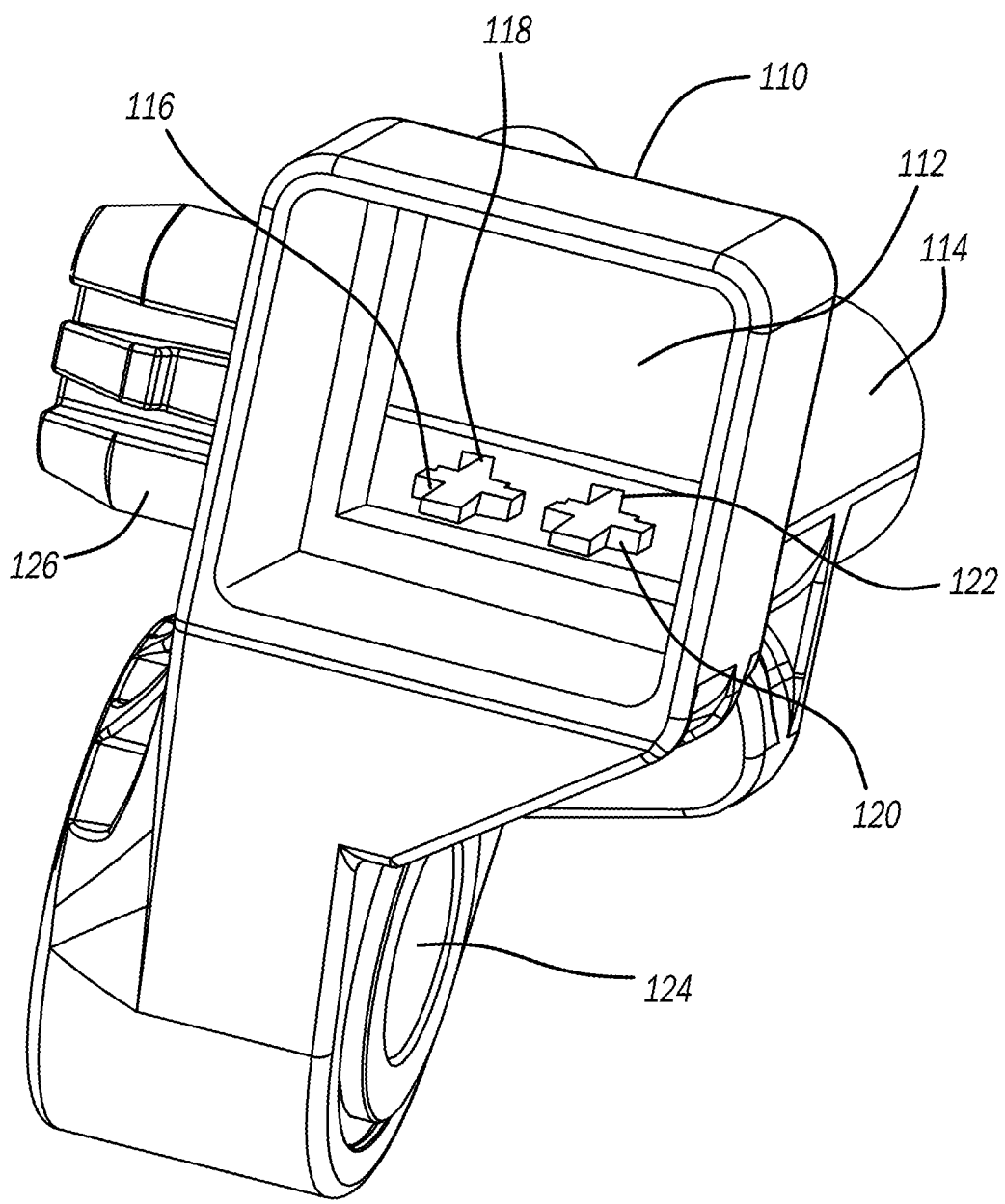
FIG. 1 is a perspective view of a remote sensing unit with vents integrating into terminal apertures.

FIG. 1 is a perspective view of a remote sensing unit with vents integrating into terminal apertures. The remote sensing housing 110 forms a cavity 112 that may be used to protect sensing circuitry. The sensing circuitry may transmit and receive communications with other vehicle devices through a connector 114. Electrical signals may be communicated between the sensing electronics and the connector 114 through terminals (e.g., first terminal 116 and a second terminal 120). As such, the first and second terminals 116, 120 may be connected to the sensing circuitry inside the cavity 112 and extend through a wall of the housing into the connector 114 to mate with a wire harness that provides communication to other vehicle components. The housing 110 also includes a first vent hole 118 and a second vent hole 122 (e.g. passageways between the cavity 112 and the recess of the connector 114). The first and second vent holes 118, 122 may be formed as part of the terminal holes (e.g. openings) through which the first and second terminals 116, 120 are inserted. As such, the first vent hole 118 and second vent hole 122 may form passageways from the cavity 112 to the recess formed in the connector 114. When the sensing electronics are placed within the cavity 112, epoxy or other sealing substance may be inserted into the cavity over the sensing electronics. As the epoxy or other sealing material settles, bubbles or gas may be trapped between the electronic sensing circuitry and may create pressure against the circuitry in the cavity. As such, the gas or bubbles may be evacuated or allowed to exit through the first vent hole 118 and the second vent hole 122.

Bushing 124 allowing the housing unit 110 to be fastened to a sheet metal assembly. The housing 110 may be fastened to the sheet metal assembly by a bolt extended through the bushing 124 and locked onto the sheet metal assembly by a nut that engages the bolt on the opposite side of the sheet metal surface. Further, the housing 110 may include an orientation tab 126 that may extend through an opening in the sheet metal assembly to fix the orientation of the housing 110 relative to the sheet metal assembly.

Figure 2:
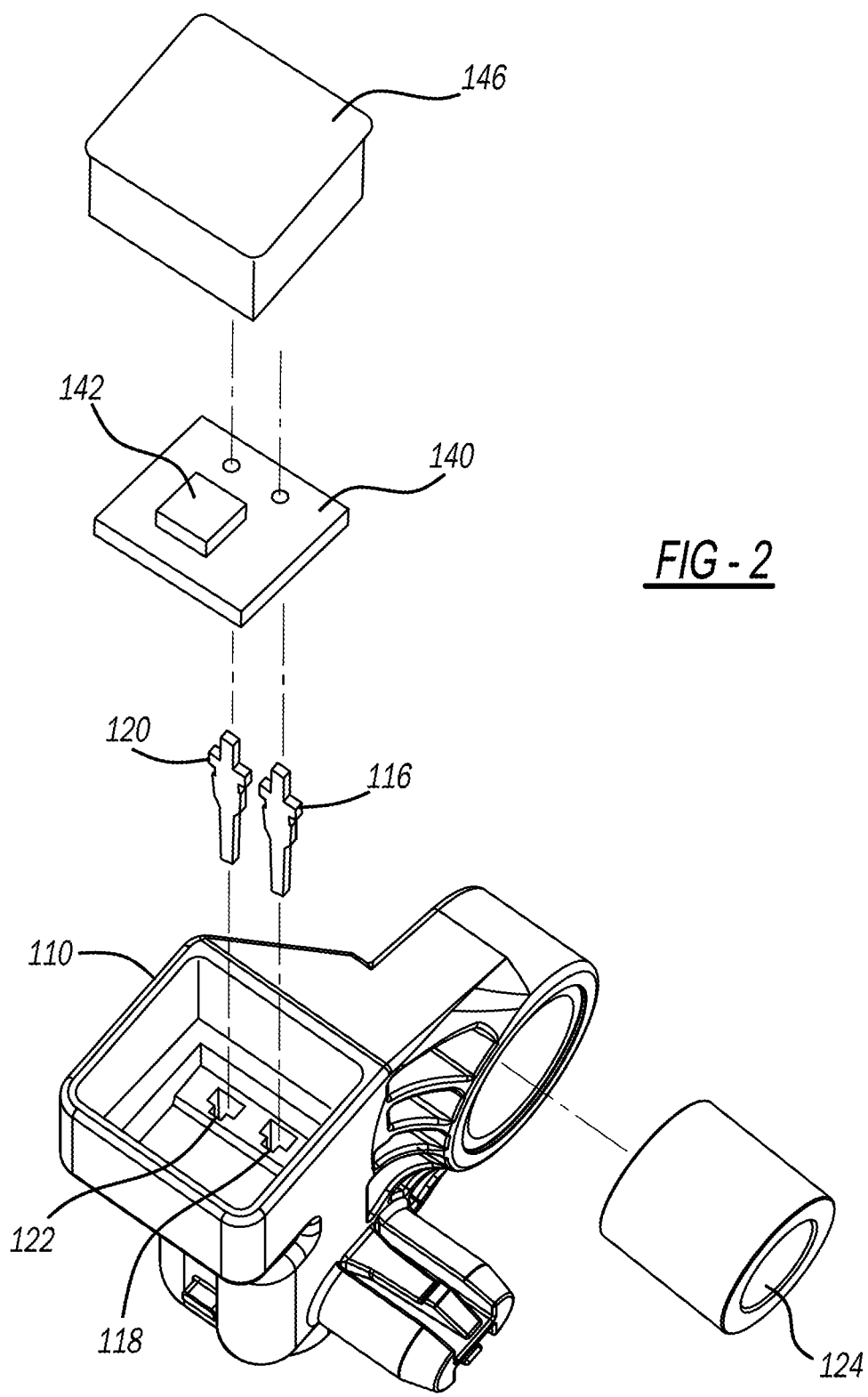
FIG. 2 is an exploded perspective view of the remote sensing unit of FIG.

FIG. 2 is an exploded perspective view of the remote sensing unit of FIG. 1. The first and second vent holes 118, 122 may be formed as part of the terminal holes allowing the terminals 116, 120 to be stitched into each of the terminal holes and still allow the passage of gases through the first and second vent holes 118, 122 while the terminals 116, 120 are inserted into the terminal holes. The sensing electronics 140 including a sensing chip 142 may be inserted into the cavity 112 and connected to the terminals 116, 120 through terminal holes in the sensing electronics. As discussed previously, an epoxy or other sealing material may then be inserted over the sensing electronics 140. In addition, a cover 146 may be placed over the sensing electronics and/or the sealant further sealing the sensing electronics from environmental conditions.

Figure 3:
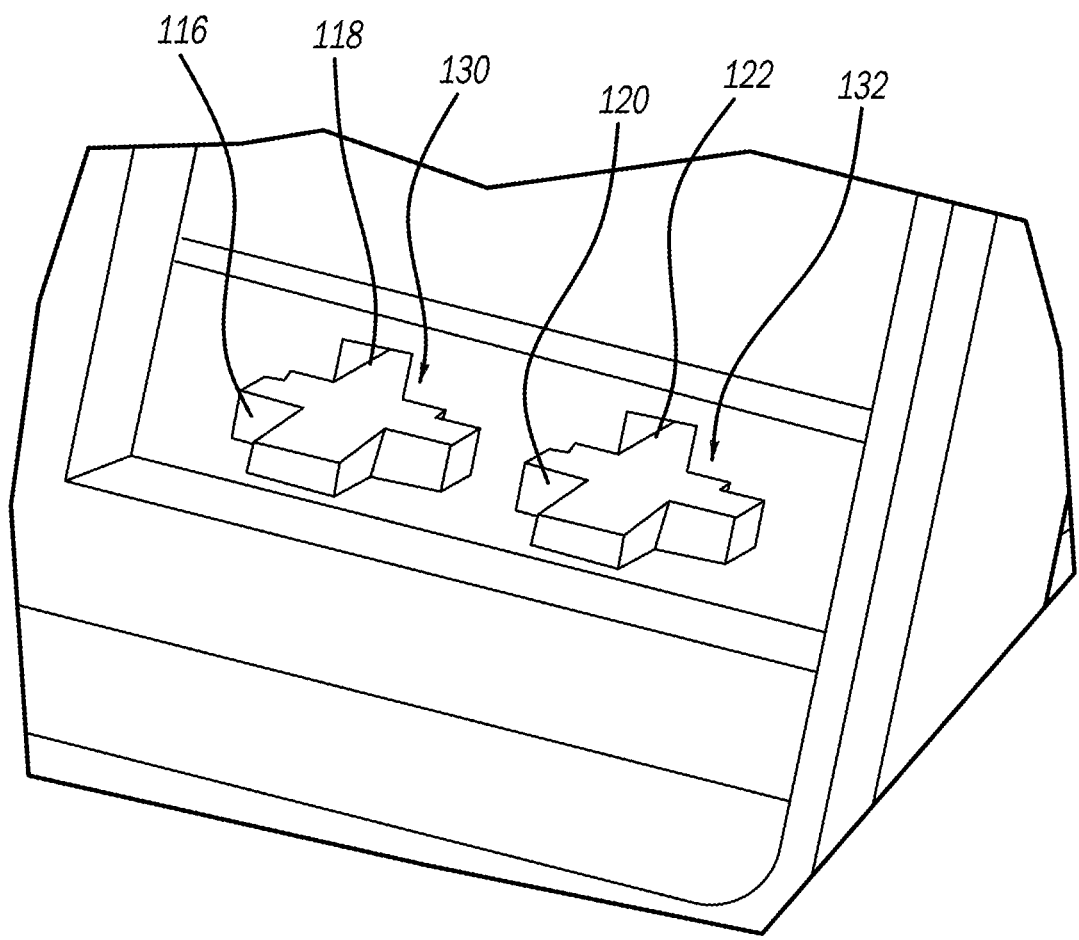
FIG. 3 is an enlarged view of the sensor electronics cavity of the housing.

FIG. 3 is an enlarged view of the cavity 112 of the housing 110. In the expanded view, the first terminal hole 130 is illustrated with the first terminal 116 inserted in the first terminal hole 130. In addition, the first vent hole 118 forms part of the first terminal hole 130 and may extend from the portion of the terminal hole 130 from which the first terminal 116 is inserted. The first terminal hole 130 (e.g. opening) has a cross-sectional profile larger than the cross-sectional profile of the first terminal 116 such that first vent hole 118 (e.g. passage) is formed between the cavity 112 and the recess of the connector 114 after the first terminal 116 is inserted through the terminal hole 130. In some implementations, the first vent hole 118 may include a cross-sectional area that is greater than 0.1 mm$^2$.

The second terminal hole 132 is illustrated with the second terminal 120 inserted in the second terminal hole 132. The second vent hole 122 forms part of the second terminal hole 132 and may extend from the portion of the second terminal hole 132 from which the second terminal 120 is inserted. The second vent hole 122 may include a cross-sectional area that is greater than 0.1 mm$^2$ or in some implementations the cross-sectional area of all vent holes combined is greater than 0.5 mm$^2$. For example, for the implementation illustrated the combined cross-sectional area of the first vent hole 118 and the second vent hole 122 may be greater than 0.5 mm$^2$.

Figure 4:
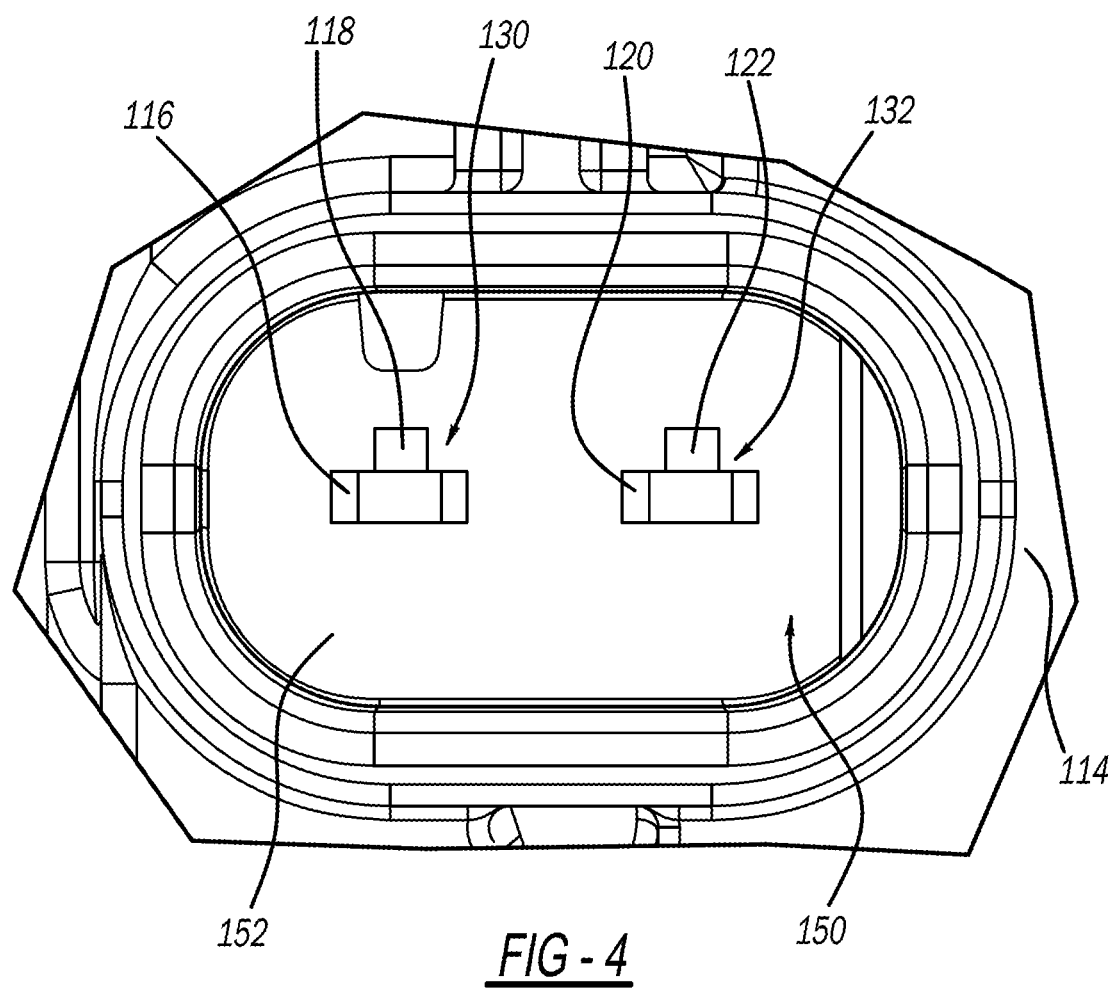
FIG. 4 is an enlarged view of the connector and the recess of the connector.

FIG. 4 is an enlarged view of the connector 114 and the connector recess 150. The vent holes 118, 122, as well as, the entire connector holes 130, 132 may extend through the wall 152 from the cavity 112 to the connector recess 150 allowing gas to escape from the cavity 112 through the connector recess 150.

Figure 5A:
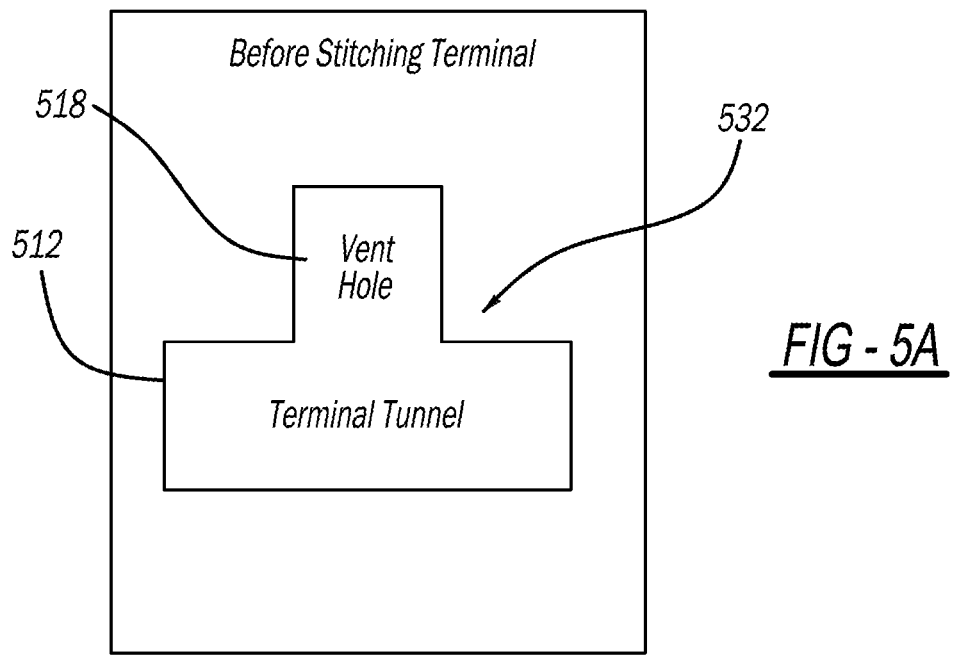
FIG. 5A is an illustration of one implementation of a terminal hole including a vent hole.

FIG. 5A is an illustration of a terminal hole 532. The terminal hole 532 includes a terminal portion 512 where the terminal may be stitched through the terminal hole 532 to provide an electrical connection from the cavity 112 to the recess 150. The vent hole 518 may be formed as part of the terminal hole 532 and may extend from the terminal portion 512 of the terminal hole 532 in the shape of a square or rectangle (although other shapes may be implemented in this pattern, e.g. as discussed with regard to FIG. 9 and FIG. 10). Further, the vent hole 518 may be centered horizontally relative to the terminal portion 512 of the terminal hole 532.

Figure 5B:
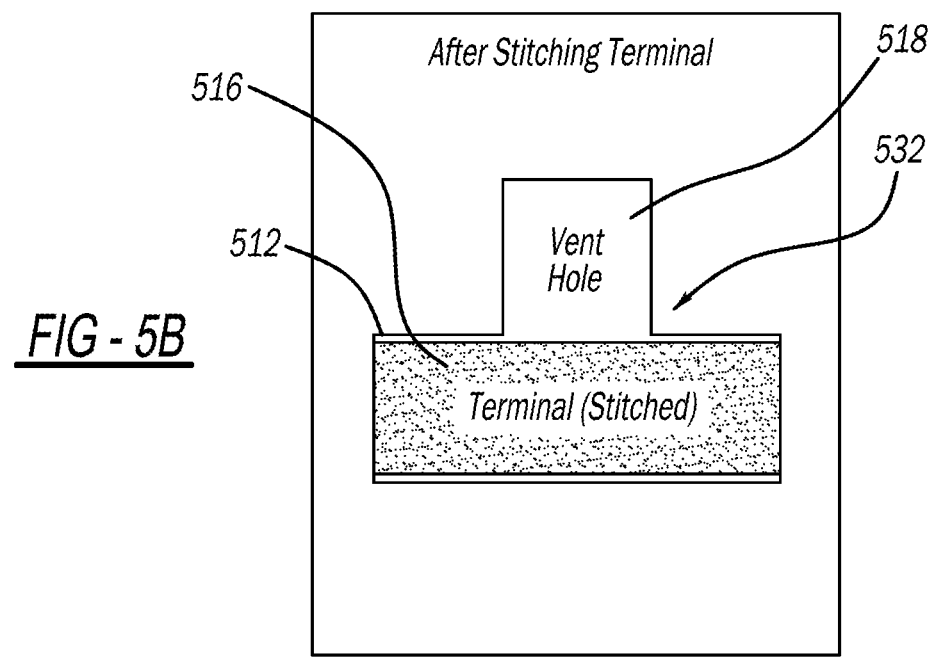
FIG. 5B is an illustration of the terminal hole of FIG. 5A with a terminal inserted.

FIG. 5B illustrates the terminal hole 532 after the terminal 516 is stitched into the terminal portion 512 of the terminal hole 532. The vent hole 518 may remain clear allowing gas or other substances to pass through the wall while the terminal 516 is stitched into the terminal hole 532.

Figure 6A:
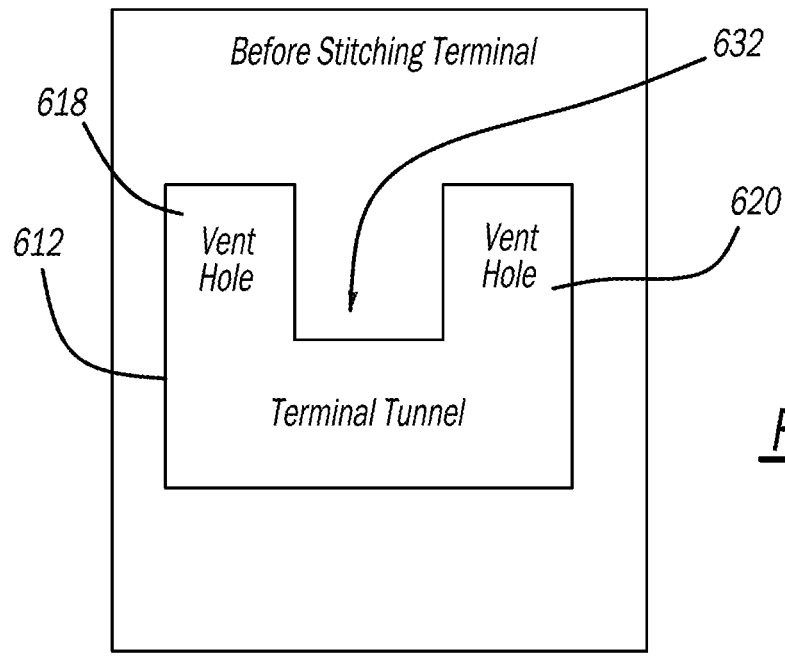
FIG. 6A is an illustration of another implementation of a terminal hole including vent holes.

FIG. 6A is an illustration of a terminal hole 632. The terminal hole 632 includes a terminal portion 612 where the terminal may be stitched through the terminal hole 632 to provide an electrical connection from the cavity 112 to the recess 150. The first vent hole 618 and the second vent hole 620 may be formed as part of the terminal hole 632 and may each extend from the terminal portion 612 of the terminal hole 632 in the shape of a square or rectangle (although other shapes may be implemented in this pattern as discussed with regard to FIG. 9A and FIG. 10A). Further, the first vent hole 618 may extend from one end of the terminal portion 612 of the terminal hole 632 and the second vent hole 620 may extend from an opposite end of the terminal portion 612 of the terminal hole 632. The first vent hole 618 and the second vent hole 620 may extend in the same direction (e.g. on the same side of the terminal hole 632, as illustrated) or in opposite directions (e.g. one up and one down relative to the figure).

Figure 6B:
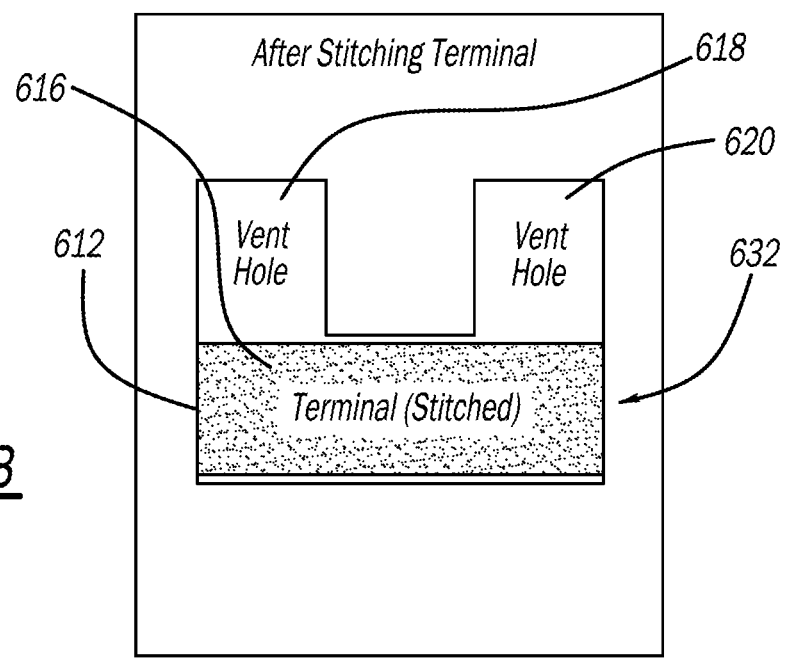
FIG. 6B is an illustration of the terminal hole of FIG. 6A with a terminal inserted.

FIG. 6B illustrates the terminal hole 632 after the terminal 616 is stitched into the terminal portion 612 of the terminal hole 632. The first vent hole 618 and the second vent hole 620 may remain clear allowing gas or other substances to pass through the wall while the terminal 616 is stitched into the terminal hole 632.

Figure 7A:
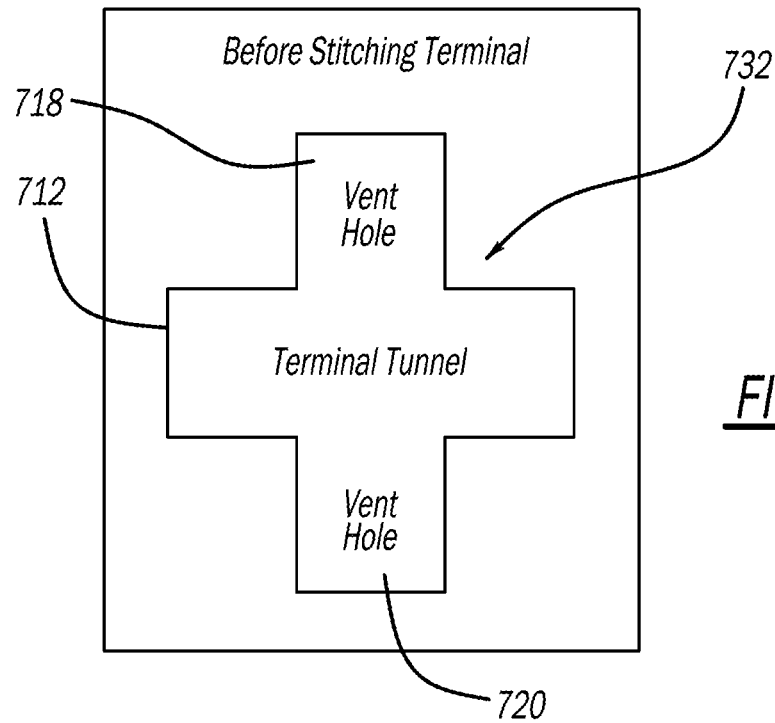
FIG. 7A is an illustration of another implementation of a terminal hole including vent holes.

FIG. 7A is an illustration of a terminal hole 732. The terminal hole 732 includes a terminal portion 712 where the terminal may be stitched through the terminal hole 732 to provide an electrical connection from the cavity 112 to the recess 150. The first vent hole 718 and the second vent hole 720 may be formed as part of the terminal hole 732 and may each extend from the terminal portion 712 of the terminal hole 732 in the shape of a square or rectangle (although other shapes may be implemented in this pattern as discussed with regard to FIG. 9A and FIG. 10A). Further, the first vent hole 718 may extend from the center of the terminal portion 712 of the terminal hole 732 in a first direction and the second vent hole 720 may extend from the center of the terminal portion 712 of the terminal hole 732 in another direction (e.g. the opposite direction). As such, the first vent hole 718 may be on an opposite side of the terminal portion 712 from the second vent hole 720.

Figure 7B:
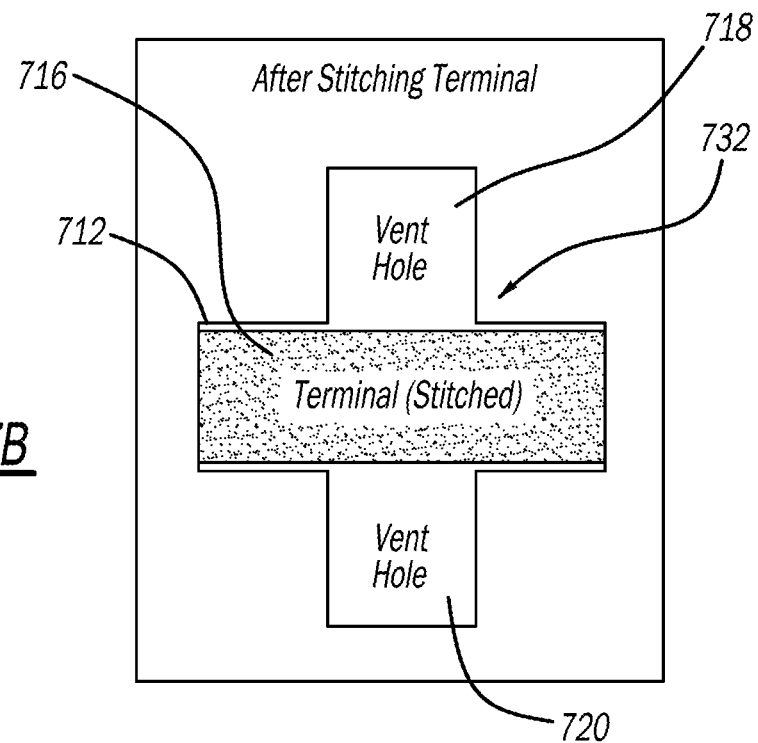
FIG. 7B is an illustration of the terminal hole of FIG. 7A with a terminal inserted.

FIG. 7B illustrates the terminal hole 732 after the terminal 716 is stitched into the terminal portion 712 of the terminal hole 732. The first vent hole 718 and the second vent hole 720 may remain clear allowing gas or other substances to pass through the wall while the terminal 716 is stitched into the terminal hole 732.

Figure 8A:
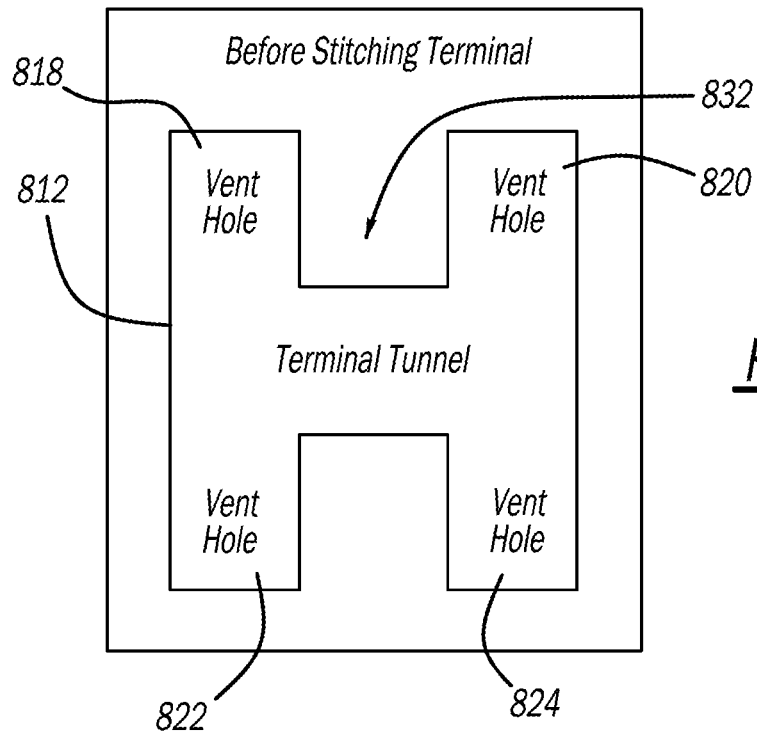
FIG. 8A is an illustration of another implementation of a terminal hole including vent holes.

FIG. 8A is an illustration of a terminal hole 832. The terminal hole 832 includes a terminal portion 812 where the terminal may be stitched through the terminal hole 832 to provide an electrical connection from the cavity 112 to the recess 150. The first vent hole 818, the second vent hole 820, the third vent hole 822 and the fourth vent hole 824 may be formed as part of the terminal hole 832 and may each extend from the terminal portion 812 of the terminal hole 832 in the shape of a square or rectangle (although other shapes may be implemented in this pattern as discussed with regard to FIG. 9A and FIG. 10A). Further, the first vent hole 818 and third vent hole 822 may extend from one end of the terminal portion 812 of the terminal hole 832. The second vent hole 820 and the fourth vent hole 824 may extend from an opposite end of the terminal portion 812 of the terminal hole 832. The first vent hole 818 and the second vent hole 820 may extend from the terminal portion 812 of the terminal hole 832 in a first direction (e.g. vertically up in the illustration). The third vent hole 822 and the fourth vent hole 824 may extend from the terminal portion 812 of the terminal hole 832 in a second direction (e.g. vertically down in the illustration). The first direction may be opposite from the second direction.

Figure 8B:
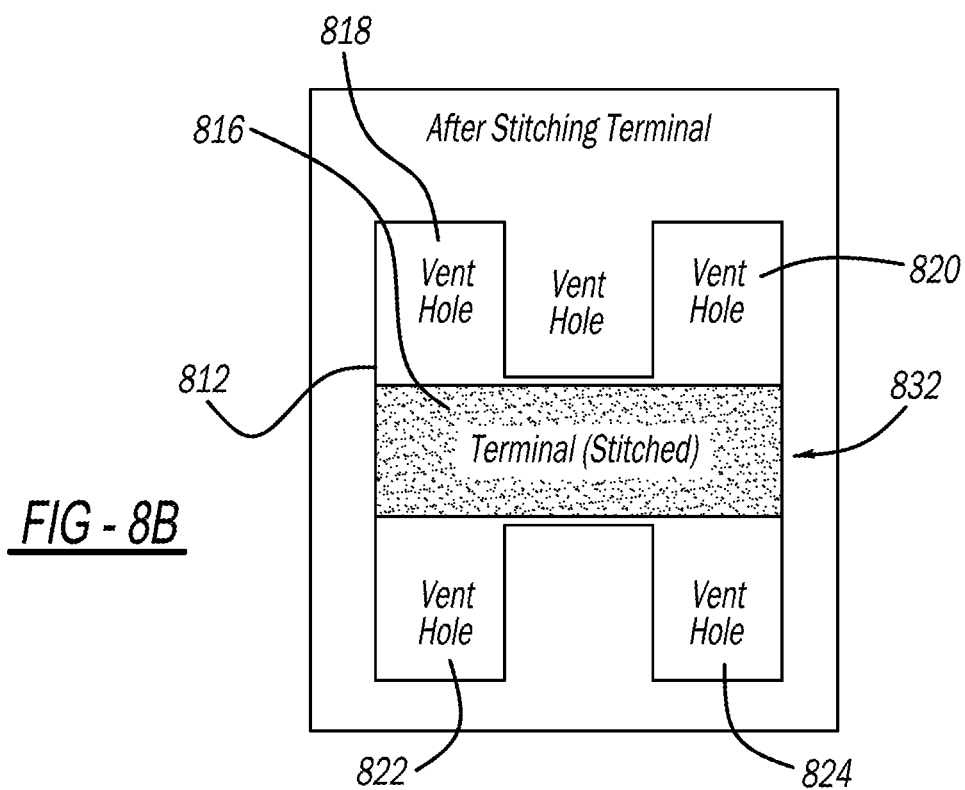
FIG. 8B is an illustration of the terminal hole of FIG. 8A with a terminal inserted.

FIG. 8B illustrates the terminal hole 832 after the terminal 816 is stitched into the terminal portion 812 of the terminal hole 832. The first vent hole 818, the second vent hole 820, the third vent hole 822 and the fourth vent hole 824 may remain clear allowing gas or other substances to pass through the wall while the terminal 816 is stitched into the terminal hole 832.

Figure 9A:
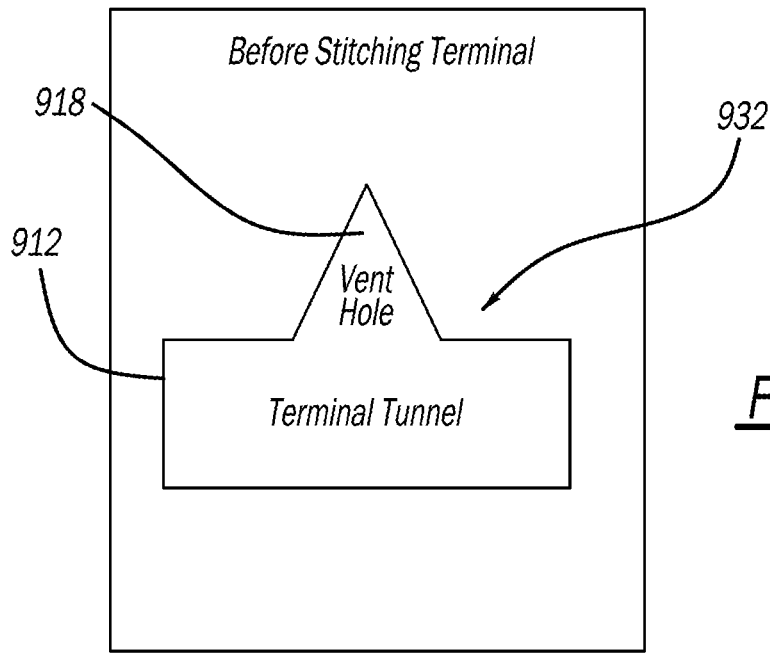
FIG. 9A is an illustration of another implementation of a terminal hole including a vent hole.

FIG. 9A is an illustration of a terminal hole 932. The terminal hole includes a terminal portion 912 where the terminal may be stitched through the terminal hole 932 to provide an electrical connection from the cavity 112 to the recess 150. The vent hole 918 may be formed as part of the terminal hole 932 and may extend from the terminal portion 912 of the terminal hole 932 in the shape of a triangle (e.g. with the base of the triangle adjacent to the terminal portion 912). Further, the vent hole 918 may be centered horizontally relative to the terminal portion 912 of the terminal hole 932. (Although multiple triangular vent holes may be used in various patterns, e.g. as discussed with regard to FIGS. 6A, 7A, and 8A).

Figure 9B:
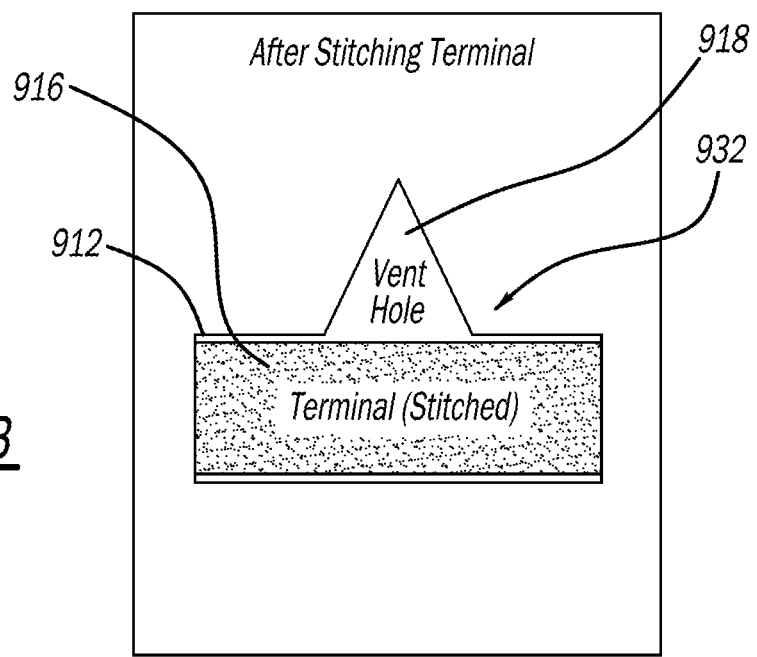
FIG. 9B is an illustration of the terminal hole of FIG. 9A with a terminal inserted.

FIG. 9B illustrates the terminal hole 932 after the terminal 916 is stitched into the terminal portion 912 of the terminal hole 932. The vent hole 918 may remain clear allowing gas or other substances to pass through the wall while the terminal 916 is stitched into the terminal hole 932.

Figure 10A:
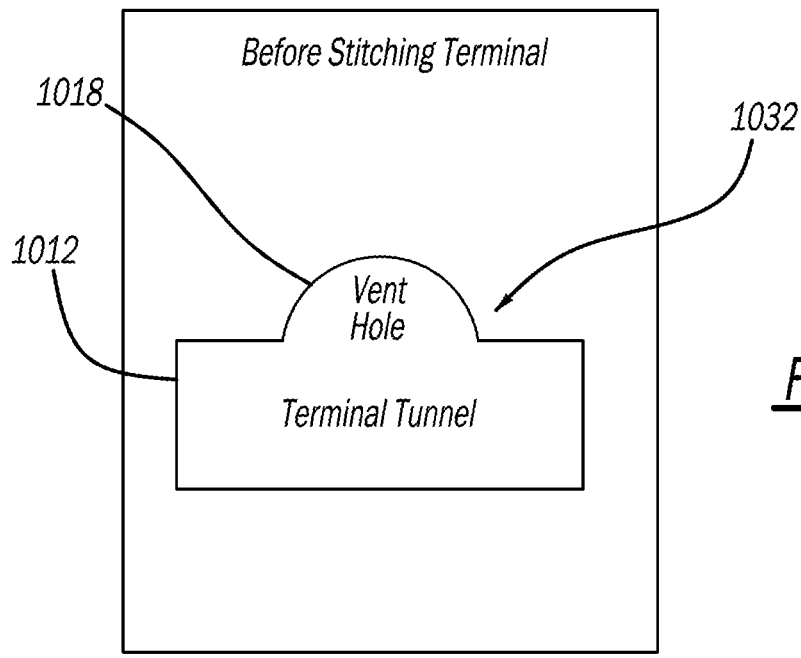
FIG. 10A is an illustration of another implementation of a terminal hole including a vent hole.

FIG. 10A is an illustration of a terminal hole 1032. The terminal hole includes a terminal portion 1012 where the terminal may be stitched through the terminal hole 1032 to provide an electrical connection from the cavity 112 to the recess 150. The vent hole 1018 may be formed as part of the terminal hole 1032 and may extend from the terminal portion 1012 of the terminal hole 1032 in a semi-circular shape (e.g. with the base of the semi-circle adjacent to the terminal portion 1012). Further, the vent hole 1018 may be centered horizontally relative to the terminal portion 1012 of the terminal hole 1032. (Although multiple triangular vent holes may be used in various patterns, e.g. as discussed with regard to FIGS. 6A, 7A, and 8A).

Figure 10B:
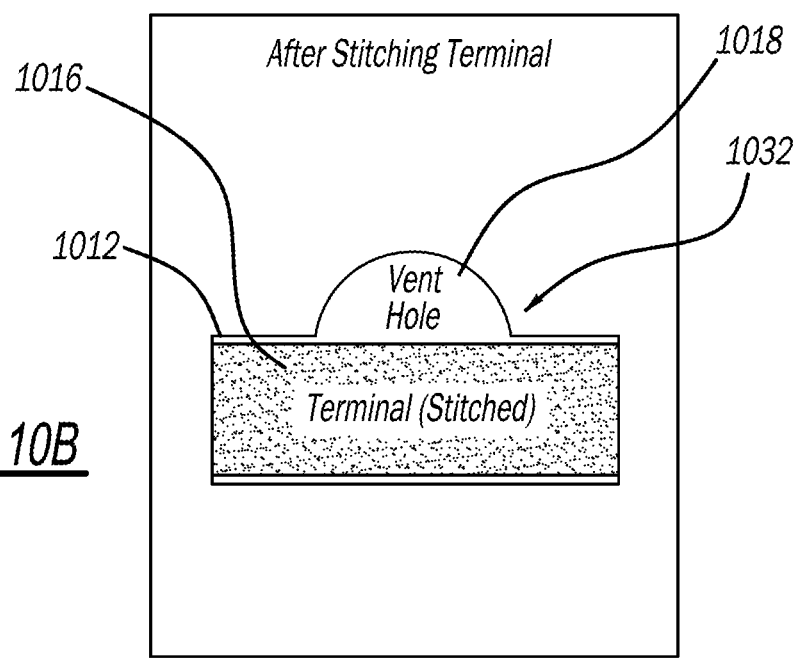
FIG. 10B is an illustration of the terminal hole of FIG. 10A with a terminal inserted.

FIG. 10B illustrates the terminal hole 1032 after the terminal 1016 is stitched into the terminal portion 1012 of the terminal hole 1032. The vent hole 1018 may remain clear allowing gas or other substances to pass through the wall while the terminal 916 is stitched into the terminal hole 1032.

As a person skilled in the art will readily appreciate, the above description is meant as an illustration of the principles of this application. This description is not intended to limit the scope or application of the claim in that the assembly is susceptible to modification, variation and change, without departing from spirit of this application, as defined in the following claims.

The invention claimed is:

1. A sensor assembly for mounting on sheet metal of a vehicle assembly, the sheet metal having a sheet metal opening for mounting the sensor assembly, the sensor assembly comprising:

a sensor circuit; and a housing comprising a cavity that receives the sensor circuit, the housing comprising a connector recess and at least one terminal, the at least one terminal extending into the connector recess and providing an electrical connection to the sensor circuit, the housing having at least one opening between the cavity and the connector recess, the at least one terminal extending from the cavity to the recess through the at least one opening that corresponds with the at least one terminal, where the at least one opening has a cross sectional profile larger than a cross sectional profile of the at least one terminal such that at least one passage is formed between the cavity and the recess after the at least one terminal is inserted through the at least one opening, wherein the at least one terminal includes a spade terminal that extends between two opposite walls of the at least one opening, and wherein the at least one passage is defined in an edge of the opening extending between the two opposite walls of the at least one opening.

2. The sensor assembly according to claim 1, wherein the cross sectional profile of the at least one passage is greater than 0.1 mm$^2$.

3. The sensor assembly according to claim 1, wherein the cavity is sealed with epoxy.

4. The sensor assembly according to claim 1, wherein the at least one passage is at least two passages and the at least two passages are formed on opposite sides of a terminal of the at least one terminal.

5. The sensor assembly according to claim 1, wherein the at least one passage comprises a semi-circular shape.

6. The sensor assembly according to claim 1, wherein the at least one passage comprises rectangular shape.

7. The sensor assembly according to claim 1, wherein the at least one passage comprises triangular shape.

8. The sensor assembly according to claim 1, wherein the at least one passage defines a width that is shorter than a distance between the two opposite walls of the at least one opening.

9. The sensor assembly according to claim 1, wherein the at least one passage defines a width that is shorter than a width of the at least one terminal.

10. The sensor assembly according to claim 1, wherein the at least one passage is at least two passages and the at least two passages are formed on a same side of a terminal of the at least one terminal at opposite ends.

11. The sensor assembly according to claim 10, wherein a wall extends between the at least two passages thereby separating the passages when the terminal of the at least one terminal is inserted.

12. The sensor assembly according to claim 1, wherein the at least one passage comprises at least four passages; the at least four passages comprising a first group of passages formed on a same side of a terminal of the at least one terminal at opposite ends of the terminal and a second group of passages formed on an opposite side of the terminal at opposite ends of the terminal.

13. The sensor assembly according to claim 12, wherein a wall of the at least one opening extends between the first group of passages thereby separating the first group of passages when the terminal is inserted, and the wall extending between the second group of passages thereby separating the second group of passages when the terminal is inserted.

14. A circuit assembly for mounting on a vehicle assembly and configured to connect with a wire harness, the circuit assembly comprising:

a circuit; and a housing comprising a cavity that receives the circuit, the circuit being sealed in the cavity by sealant, the housing comprising a connector recess configured to connect with the wire harness, the housing having an opening between the cavity and the connector recess, a terminal extending from the cavity to the recess through the opening, the terminal being electrically connected to the circuit in the cavity, where the opening has a cross sectional profile larger than a cross sectional profile of the terminal such that at least one passage is formed between the cavity and the recess after the terminal is inserted through the opening, wherein the terminal includes a spade terminal that extends between two opposite walls of the at least one opening, and wherein the at least one passage is defined in an edge of the opening extending between the two opposite walls of the at least one opening.

15. The circuit assembly according to claim 14, wherein at least one passage includes a first passage and a second passage when the terminal is inserted and the first passage is formed on an opposite side of the terminal from the second passage.

16. The circuit assembly according to claim 14, wherein the at least one passage includes a first passage and a second passage when the terminal is inserted and the first passage is formed on a same side of the terminal from the second passage at opposite ends of the terminal.

17. The circuit assembly according to claim 16, wherein a wall of the opening extends between the first and second passages thereby separating the first and second passage when the terminal is inserted.

18. The circuit assembly according to claim 14, wherein the opening forms a first, second, third, and fourth passage when the terminal is inserted; the first and second passages being formed on a same side of the terminal at opposite ends of the terminal and the third and fourth passages being formed on an opposite side of the terminal at opposite ends of the terminal.

19. The circuit assembly according to claim 18, wherein a wall of the opening extends between the first and second passages thereby separating the first and second passages when the terminal is inserted, and the wall extending between the third and fourth passages thereby separating the third and fourth passages when the terminal is inserted.

20. A sensor assembly for mounting on sheet metal of a vehicle assembly, the sheet metal having a sheet metal opening for mounting the sensor assembly, the sensor assembly comprising:

a sensor circuit; and a housing comprising a cavity that receives the sensor circuit, the housing comprising a connector recess and a terminal, the terminal extending into the connector recess and providing an electrical connection to the circuit, the housing having an opening between the cavity and the connector recess, the terminal extending from the cavity to the recess through the opening, where the opening has a cross sectional profile larger than a cross sectional profile of the terminal such that first and second passages are formed between the cavity and the recess after the terminal is inserted through the opening, wherein the first passage is formed on an opposite side of the terminal from the second passage.

* * * * *